(12) United States Patent
Alagha et al.

(10) Patent No.: US 9,369,727 B2
(45) Date of Patent: Jun. 14, 2016

(54) STORAGE OF DEPTH INFORMATION IN A DIGITAL IMAGE FILE

(71) Applicant: Intel Corporation, Santa Clara, CA (US)

(72) Inventors: Houman Alagha, Tustin, CA (US); Russell S. Love, Palo Alto, CA (US); Peter W. Winer, Los Altos, CA (US); Krishna Kaza, Santa Clara, CA (US); Kabeer R. Manchanda, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 26 days.

(21) Appl. No.: 14/328,231

(22) Filed: Jul. 10, 2014

(65) Prior Publication Data

US 2016/0014424 A1    Jan. 14, 2016

(51) Int. Cl.

| G06K 9/36 | (2006.01) |
|---|---|
| G06T 15/00 | (2011.01) |
| H04N 19/467 | (2014.01) |
| H04N 13/00 | (2006.01) |
| H04N 13/02 | (2006.01) |
| H04N 19/597 | (2014.01) |

(52) U.S. Cl.
CPC ......... *H04N 19/467* (2014.11); *H04N 13/0048* (2013.01); *H04N 13/0271* (2013.01); *H04N 19/597* (2014.11)

(58) Field of Classification Search
CPC .......... H04N 13/0022; H04N 13/0048; H04N 13/0271; H04N 13/0081; H04N 19/85; H04N 19/597; G06T 7/0051; G06T 9/00

USPC ........................................... 382/232; 345/419
See application file for complete search history.

(56) References Cited

U.S. PATENT DOCUMENTS

| 6,445,814 | B2* | 9/2002 | Iijima | G06T 7/0065 |
|---|---|---|---|---|
| | | | | 348/46 |
| 8,013,873 | B2* | 9/2011 | Barenbrug | G06T 15/10 |
| | | | | 345/629 |
| 8,379,942 | B2* | 2/2013 | Koutaki | H04N 1/32112 |
| | | | | 340/5.53 |
| 8,599,243 | B2* | 12/2013 | Okada | G11B 27/322 |
| | | | | 348/46 |
| 8,619,124 | B2* | 12/2013 | Tsai | H04N 13/0011 |
| | | | | 348/42 |
| 8,831,367 | B2* | 9/2014 | Venkataraman | G06T 9/00 |
| | | | | 382/233 |
| 8,988,429 | B2* | 3/2015 | Kwon | H04N 13/0271 |
| | | | | 345/419 |
| 9,137,512 | B2* | 9/2015 | Baik | G06T 7/0077 |
| 2011/0032329 | A1 | 2/2011 | Bauza et al. | |
| 2012/0320154 | A1 | 12/2012 | Berger et al. | |
| 2014/0078248 | A1 | 3/2014 | Tsukagoshi | |

FOREIGN PATENT DOCUMENTS

| JP | 2010-522475 A | 7/2010 |
|---|---|---|
| KR | 10-2011-0106367 A | 9/2011 |

OTHER PUBLICATIONS

PCT Search Report and Written Opinion for PCT Application No. PCT/US2015/034395 filed on Jun. 5, 2015, 12 pages.

\* cited by examiner

*Primary Examiner* — Kanjibhai Patel
(74) *Attorney, Agent, or Firm* — Finch & Maloney PLLC

(57) ABSTRACT

Techniques are disclosed for encoding depth-enabled digital images in a file format, such as JPEG. In addition to compressed image data, calibration, disparity and other depth-related information can be embedded in one or more application-specific segments of a given image file.

20 Claims, 4 Drawing Sheets

STORAGE OF DEPTH INFORMATION IN A DIGITAL IMAGE FILE

BACKGROUND

Depth-enabled digital photography utilizes multiple cameras or image sensors to obtain information about the apparent extent of depth of objects in a scene viewed from multiple perspectives. This information can be used, for example, to artificially generate a parallax effect when displaying images to an observer, which causes the observer to perceive the apparent extent of depth.

DETAILED DESCRIPTION

Techniques are disclosed for storing depth information in a digital image file, such as a Joint Photographic Experts Group (JPEG) file. In one example embodiment, the techniques can be implemented by computing depth information in the frame of a digital image and embedding the depth information in a JPEG image file format. The depth information can be added to and extracted from the standard JPEG file payload, as the JPEG standard provides for the addition of application-specific (e.g., non-standardized) information to the image. In this manner, any device supporting the JPEG format can display the image even if such a device is not configured to utilize the depth information. By embedding the depth information in a JPEG image file format, depth-enhanced photography can be easily shared and viewed on any device without modification.

General Overview

In digital photography and three-dimensional (3D) graphics, depth information describes the distance from a viewpoint to the surfaces of scene objects. Currently, there is no industry or open standard for capturing, storing and viewing depth-enabled images recorded by mobile devices or cameras. Without a standard format, there is no accepted standard for sharing and using depth-enabled images across multiple viewing devices, online services and computer systems.

Thus, and in accordance with an embodiment of the present disclosure, techniques are provided for encoding depth-enabled digital images in a JPEG file format. In addition to compressed image data, calibration, disparity and other depth-related information can be embedded in one or more application-specific segments of a JPEG file. These segments are also referred to in this disclosure as chunks. Although various example embodiments are provided with respect to JPEG file formats, the techniques discussed in this disclosure can be used with any number of other file formats, and particularly with standardized image file formats that allow for the addition of application-specific information to the image, such as described in this disclosure, whether it be added to the file payload, overhead, or some combination of these.

System Architecture

Figure 1:
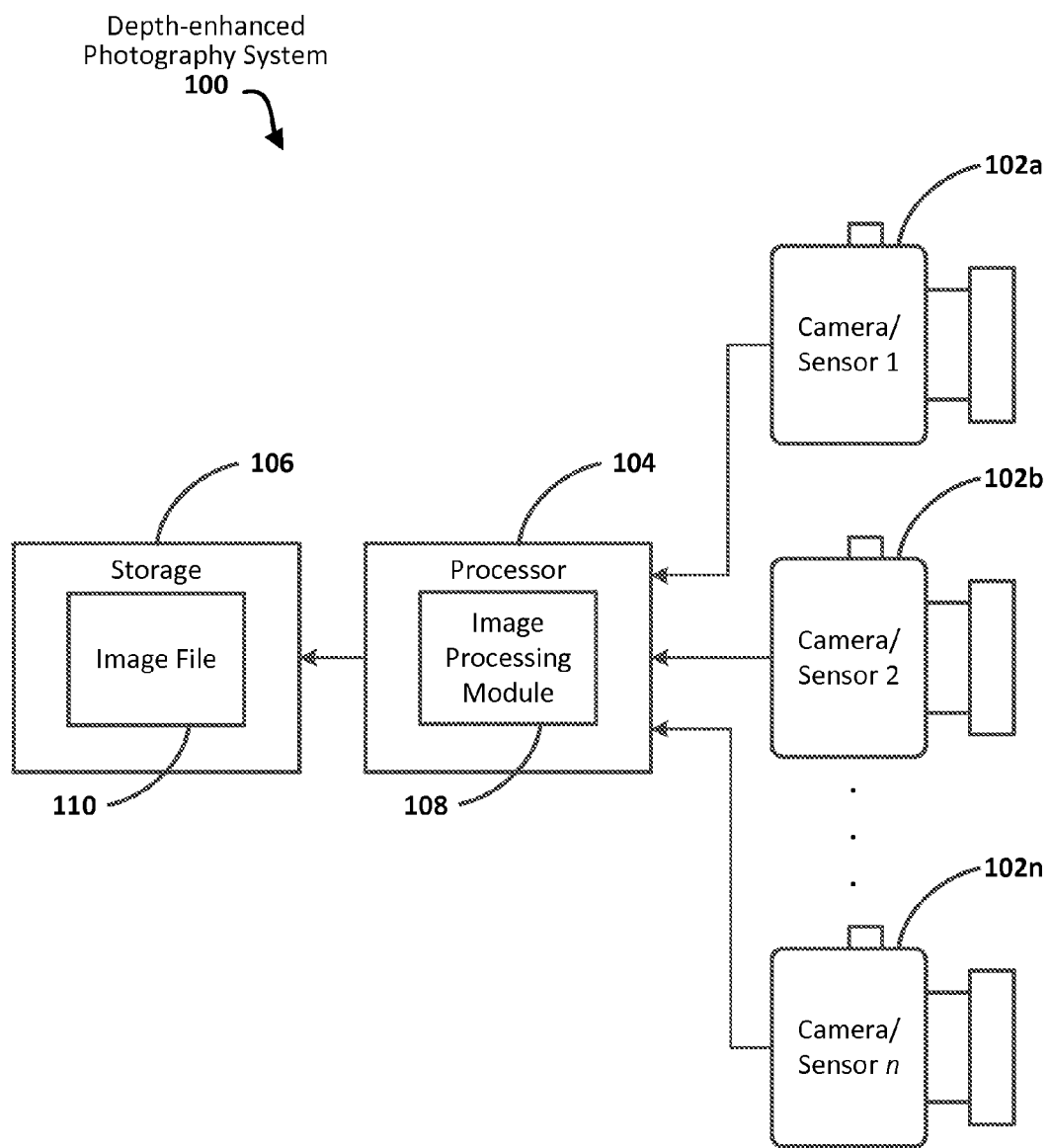
FIG. 1 illustrates a depth-enhanced photography system configured in accordance with an embodiment of the present disclosure.

FIG. 1 illustrates a depth-enhanced photography system 100 configured in accordance with an embodiment of the present disclosure. As can be seen, the system 100 generally includes one or more cameras or image sensors 102*a*, 102*b*, . . . , 102*n*, a processor 104 and a storage 106. The sensors 102*a*, 102*b*, . . . , 102*n* may, for example, be configured to detect luminance (brightness), chrominance (color), and depth or distance to points within a scene and send image data to the processor 104 and storage 106. It will be understood that other numbers, types and configurations of image sensors (e.g., multiple cameras arranged to photograph a scene from different perspectives), processors and storage may be utilized without departing from the scope of this disclosure. The processor 104 can include an image processing module 108 configured to process image data received from the sensors 102*a*, 102*b*, . . . , 102*n* into an image file 110, which can be stored in the storage 106. In some embodiments, the image file 110 is a JPEG image file; however, it will be understood that some embodiments are not limited to the JPEG format and that the image data can be stored in any suitable file format. The storage 106 can include any type of memory suitable for storing data generated by the processor 104 and the sensors 102*a*, 102*b*, . . . , 102*n*, and may be locally connected to the processor 104 or remotely connected via a data communication network (not shown). In some embodiments, the storage 106 can include instructions that when executed cause the processor 104 to carry out a process, such as the process described below with respect to FIG. 5.

In some embodiments, the system 100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing digital image acquisition or processing.

Processor 104 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 104 may comprise dual-core processor(s), dual-core mobile processor(s), and so forth. Storage 106 may be implemented, for instance, as a volatile memory device such as, but not limited to, a Random Access Memory (RAM), Dynamic Random Access Memory (DRAM), or Static RAM (SRAM). Storage 106 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 106 may comprise technology to increase the storage performance enhanced protection for valuable digital media when multiple hard drives are included, for example.

In various embodiments, any one or more of the components shown in system 100 may be integrated. For example, one or more of the cameras/sensors 102*a*, 102*b*, . . . , 102*n*, the processor 104 and the storage 106 may be integrated, or the processor 104 and storage 106 may be integrated separately from the cameras/sensors 102a, 102b, ..., 102n. These examples are not intended to limit the scope of the present disclosure.

In various embodiments, system 100 may be implemented as a wireless system, a wired system, or a combination of both. When implemented as a wireless system, system 100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The system 100 may include one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 1.

As described above, system 100 may be embodied in varying physical styles or form factors. In some embodiments, for example, the system 100, or portions of it, may be implemented as a mobile computing device having wireless capabilities. A mobile computing device may refer to any device having a processing system and a mobile power source or supply, such as one or more batteries, for example. As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

In use, one or more of the sensors 102a, 102b, ..., 102n obtain information about a scene, including reference image data and depth information relating to the distance of various objects in the scene (not shown) from an arbitrary viewpoint (e.g., the aperture of a camera lens). The reference image can be a primary reference image (e.g., a conventional two-dimensional photograph). The sensors 102a, 102b, ..., 102n can, in some embodiments, obtain additional information including, for example, one or more secondary reference images taken from a different perspective than the primary reference image, such as found in three-dimensional photography. Other techniques for obtaining depth-enabled photography information from the sensors 102a, 102b, ..., 102n will be apparent in light of this disclosure. Once the information is obtained, the image processing module 108 generates the image file 110 containing the information in a structured format. Examples of the structure of the image file 110 are discussed below with respect to FIGS. 2-4.

Figure 2:
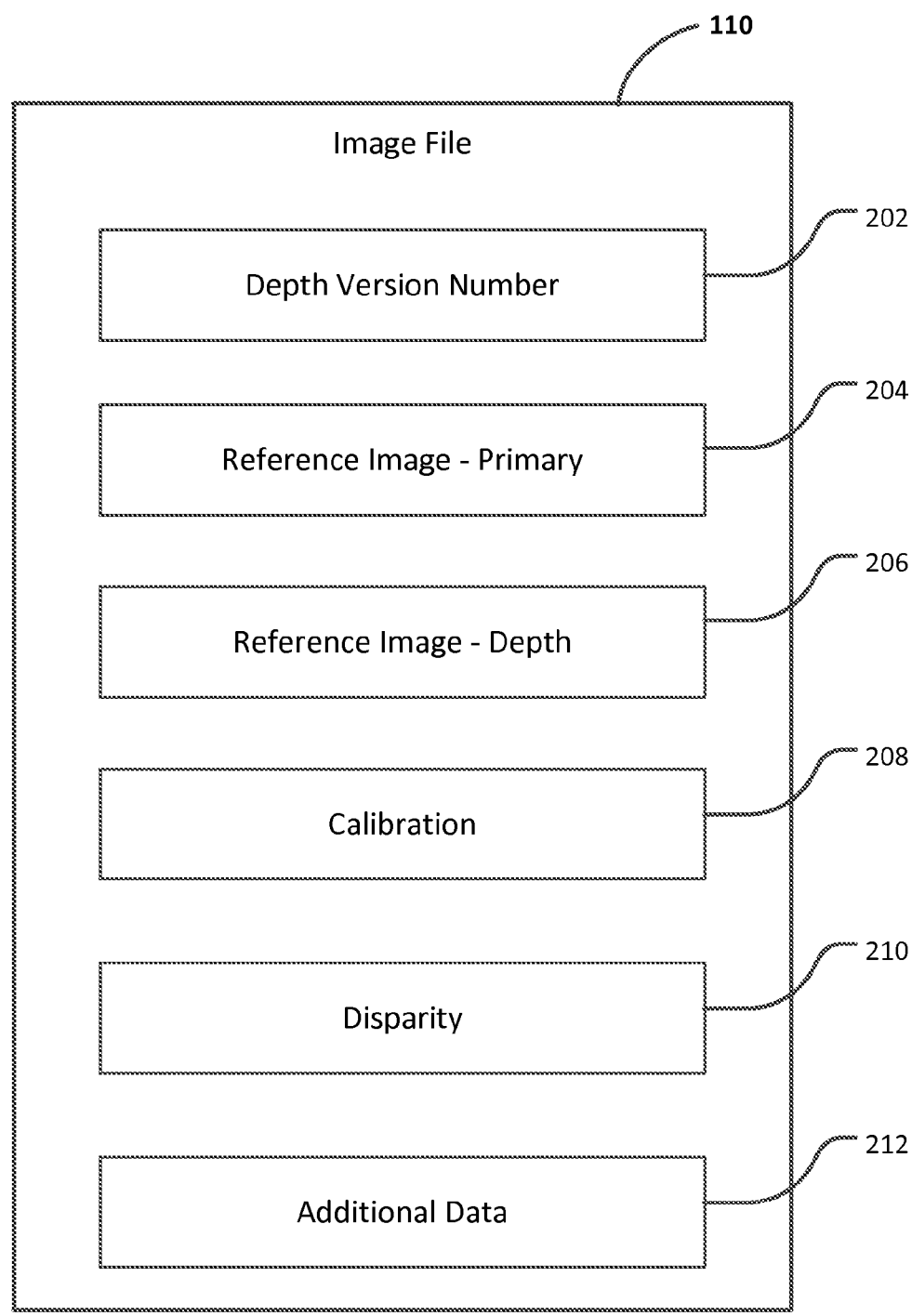
FIG. 2 illustrates an example of an image file configured in accordance with an embodiment of the present disclosure.

FIG. 2 illustrates an example of the image file 110 of FIG. 1 configured in accordance with an embodiment of the present disclosure. The image file 110 includes one or more of the following pieces of information (also referred to in this disclosure as payload data): a depth version number 202, primary reference image data 204, depth reference image data 206, calibration information 208, disparity information 210 and, if any, additional data 212 (e.g., metadata describing the image file 110, such as tags, uniform resource locators (URLs) for web viewing, or other contextual payload data).

According to an embodiment, the calibration information 208 can contain one or more of the following: calibration version number (e.g., 1, 2, 3, ... ); calibration type (e.g., factory or field); number of cameras; number of views; RMS (root-mean-square) image contrast; camera type (e.g., Davis Reef); camera calibrations; rectification; camera number, identification number, reference number, position relative to reference camera in a 2×1 matrix, and sensor resolution in a 2×1 matrix. In some cases, the camera calibration information can include one or more of the following: image resolution, K—an intrinsic 3×3 matrix (double) (includes the focal length) (high or low); D—a distortion coefficient 1×5 matrix (double); R—a rotation 3×3 matrix (double); T—translation vectors of camera centers (negation of C) in a 3×1 matrix in millimeters (mm) (double); C—an optical center (x, y, z) of the camera in mm, where the translation vector T=−C. In some cases, the rectification information can include one or more of the following: H_H—a homography (final rectification) 3×3 matrix (double) (high); H_L—a homography (final rectification) 3×3 matrix (double) (low); rectifying K—H—high; rectifying K_L—low; and rectifying R—3 D orientation matrix. In some cases, the reference camera can be used as the world-facing reference frame.

According to an embodiment, the disparity information 210 can include a disparity map saved as an 8-bit PNG (Portable Network Graphics) file. When used, the disparity map appears as a grayscale image showing pixels with a small disparity value as a darker color and showing pixels with a large disparity value as a lighter color. If a depth map is needed by an application, a developer application or service can retrieve the disparity 210 and calibration 208 information to compute depth on the fly. Distance values can be derived from the disparity information 210, since disparity and distance from the camera(s) are inversely related. As the distance from the camera(s) increases, the disparity decreases. In some cases, the presence of the 8-bit PNG in an image file is indicative of a depth-enhanced or depth-enabled digital image encoded using one or more of the techniques described in the present disclosure.

Figure 3:
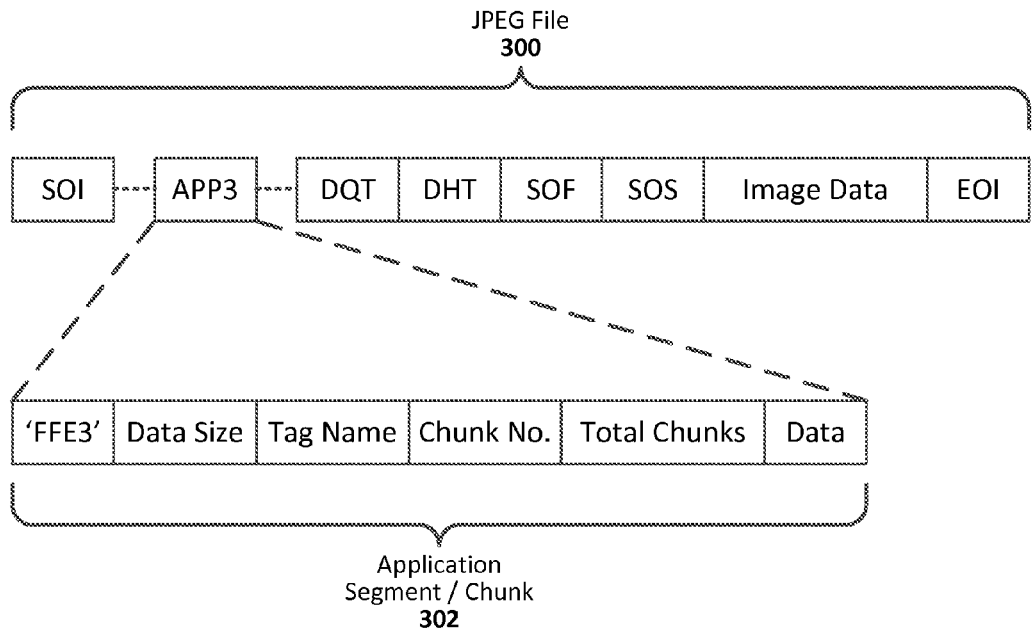
FIG. 3 illustrates an example JPEG image file that may be used in conjunction with various embodiments.

FIG. 3 illustrates an example JPEG image file 300 that may be used in conjunction with various embodiments, including a technique for encoding the example image file 110 of FIG. 2 into a JPEG format. As will be understood in light of the present disclosure, generally a JPEG image includes a sequence of data segments, each beginning with a marker indicating the type of data stored in the respective segment. For example, the first segment of the JPEG image file 300 may include the 'SOI' or Start of Image marker, followed by one or more application-specific segments, followed by other types of data segments (e.g., DQT, DHT, SOF, SOS, EOI) and compressed image data. JPEG supports up to sixteen different types of application-specific segments. In the example of FIG. 3, the APP3 segment type is utilized; however, it will be understood that other segment types (APP0 through APP15), unless reserved for other uses, can be used in a similar manner.

Each APP3 application segment is also referred to in this disclosure as a chunk. Each segment or chunk begins with a JPEG marker (e.g., FFE3 hexadecimal, which represents an "APP3" segment), followed by the size of the data in the chunk (e.g., the number of bytes in the chunk), followed by a tag name (such as described below with reference to FIG. 4), followed by a chunk number (e.g., chunk 1 of n, etc.), followed by the total number of chunks in the JPEG file 300, followed by data corresponding with the type of information referenced by the tag name. In some embodiments, the depth version number can be used to represent an arbitrarily assigned number to a particular implementation of the JPEG file 300. For example, files with a depth version number "1" may be organized differently than files with a depth version number "2"; in this manner, flexibility of design can be achieved. If the data represent disparity, the data can be encoded as an 8-bit PNG depth resolution file.

Figure 4:
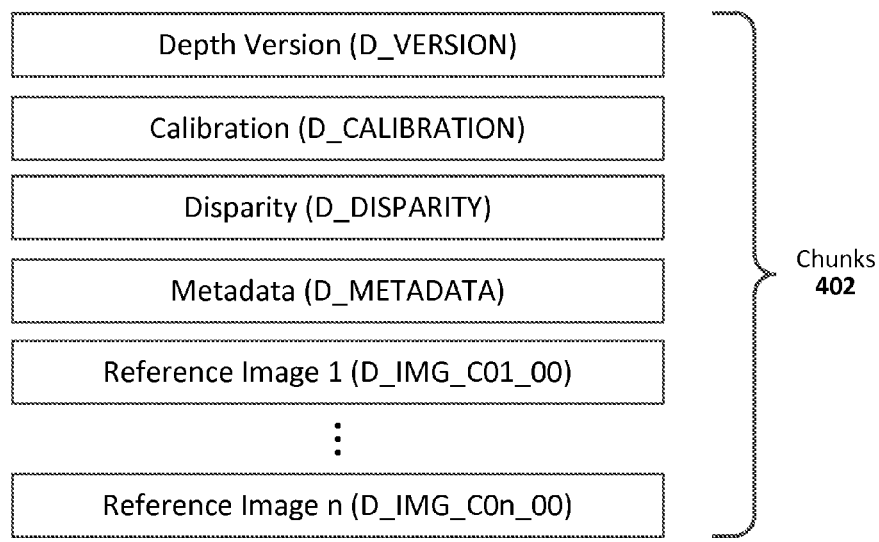
FIG. 4 illustrates an example JPEG file configured in accordance with an embodiment of the present disclosure.

FIG. 4 illustrates an example JPEG file 300 having multiple chunks 402. There can be any number of chunks 302 in the JPEG image file 300, and each chunk 402 can contain different pieces of information, such as those described above with respect to FIG. 2. Each piece of information can be associated with a unique tag name (e.g., "D_VERSION," "D_CALIBRATION," etc.) In the case of chunks 402 containing reference images, the tag name may, for example, be in the form "D_IMG_CXX_YY," where "CXX" refers to a camera or sensor number (e.g., "C01," "C02," etc.) and "YY" refers to the image number for the respective camera/sensor (e.g., "00," "01," "02," etc.). It is noted that by using JPEG application segments in this manner, any device or software that is configured to use the information stored in these segments can easily extract the information from the JPEG file 300, while other devices and software may simply ignore the chunks 402 without adverse effect to any other data stored in the JPEG file 300 (e.g., data other than that stored in the chunks 402, such as the image data following the SOS (Start of Scan) marker).

Methodology

Figure 5:
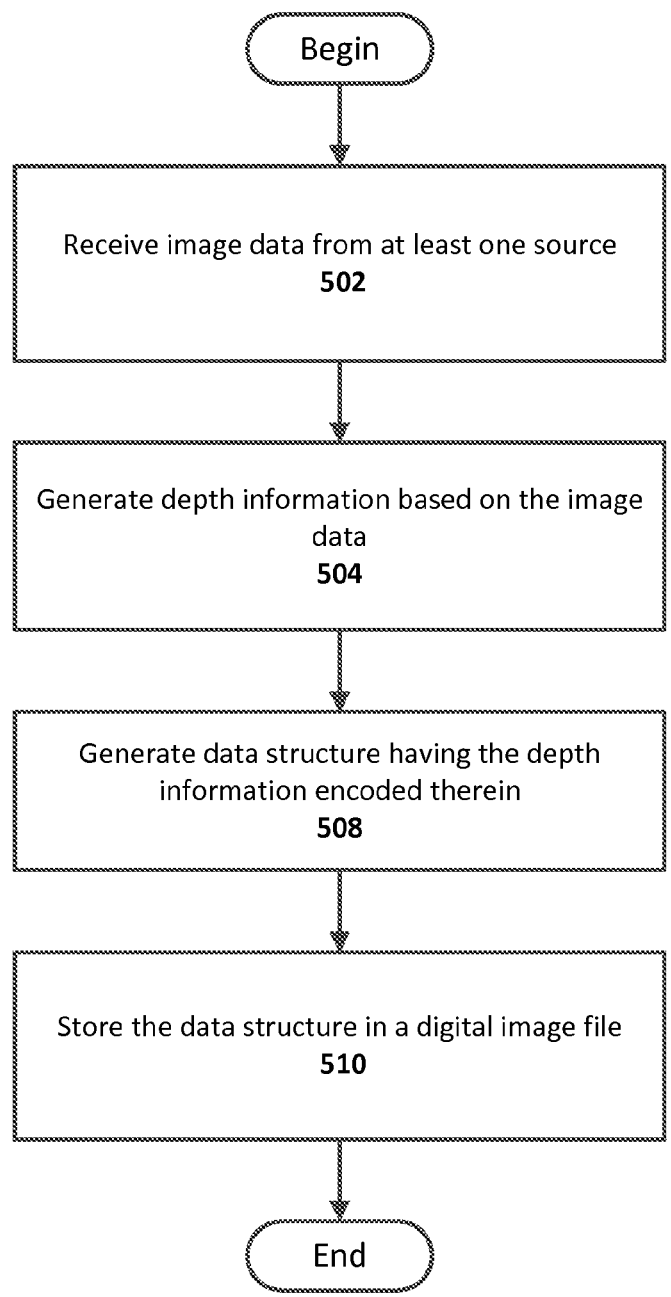
FIG. 5 illustrates a methodology for encoding depth-enabled digital images in a JPEG file format, in accordance with an embodiment of the present disclosure.

FIG. 5 illustrates a methodology for encoding depth-enabled digital images in a JPEG file format, in accordance with an embodiment of the present disclosure. The method may be implemented, for example, by the processor 104 of FIG. 1. However, the functionalities provided herein can be carried out in a distributed nature as well, if so desired. For example, some functions can be carried out by a processor local to a camera or image sensor, and other functions can be carried out by components remotely coupled to the camera/image sensor or processor. Numerous such configurations will be apparent.

As can be seen, the method includes receiving 502 image data from at least one source, such as the camera or image sensor 102a, 102b, ..., 102n, or any combination of these, as referenced with respect to FIG. 1. The method continues by generating 504 depth information based on the image data. The depth information can include calibration information, disparity information, and additional metadata, such as described above with respect to FIG. 2, or any other data. The method continues by generating 508 a data structure having the depth information encoded in the data structure. For example, the data structure may include one or more JPEG application segments each having one or more of the following: a depth version number, primary reference image data, depth reference image data, calibration information, disparity information, and additional metadata. As described above with respect to FIG. 3, the data structure can contain an application segment marker, a data size value, a tag name value, a chunk number value, a total number of chunks value, and other data corresponding to the type of information associated with the tag name. The method continues by storing 510 the data structure in a digital image file (e.g., in the JPEG image file 300 of FIG. 3). This digital image file can be stored in any suitable storage medium.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

FURTHER EXAMPLE EMBODIMENTS

The following examples pertain to further embodiments, from which numerous permutations and configurations will be apparent.

Example 1 is a method of storing depth information in a digital image file, the method comprising: generating three-dimensional (3D) depth information based on image data representing a digital image, the 3 D depth information representing a distance between a viewpoint and an object in the digital image; generating a data structure having the 3 D depth information encoded therein; and storing the data structure in the digital image file.

Example 2 includes the subject matter of Example 1, and further includes encoding the data structure in a Joint Photographic Experts Group (JPEG)-compliant application-specific segment.

Example 3 includes the subject matter of Example 2, where the application-specific segment is an APP3 segment.

Example 4 includes the subject matter of any of Examples 1-3, and further includes encoding in the data structure: a version number; reference image data; calibration data; and disparity data.

Example 5 includes the subject matter of Example 4, where the disparity data includes an 8-bit Portable Network Graphics (PNG) file.

Example 6 includes the subject matter of Example 5, where the PNG file includes a plurality of grayscale pixels each having a brightness representing a disparity value.

Example 7 includes the subject matter of any of Examples 4-6, and further includes encoding in the data structure: an application marker; an application segment length value; a tag name value; a chunk number value; a total number of chunks value; and payload data.

Example 8 is an image processing system comprising: a storage and a processor operatively coupled to the storage, the processor configured to execute instructions stored in the storage that when executed cause the processor to carry out a process comprising: generating three-dimensional (3D) depth information based on image data representing a digital image, the 3D depth information representing a distance between a viewpoint and an object in the digital image; generating a data structure having the 3D depth information encoded therein; and storing the data structure in the digital image file.

Example 9 includes the subject matter of Example 8, where the process further comprises encoding the data structure in a Joint Photographic Experts Group (JPEG)-compliant application-specific segment.

Example 10 includes the subject matter of any of Examples 8-9, where the application-specific segment is an APP3 segment.

Example 11 includes the subject matter of any of Examples 8-10, and further includes encoding in the data structure: a version number; reference image data; calibration data; and disparity data.

Example 12 includes the subject matter of Example 11, where the disparity data includes an 8-bit Portable Network Graphics (PNG) file.

Example 13 includes the subject matter of Example 12, where the PNG file includes a plurality of grayscale pixels each having a brightness representing a disparity value.

Example 14 includes the subject matter of any of Examples 11-13, and further includes encoding in the data structure: an application marker; an application segment length value; a tag name value; a chunk number value; a total number of chunks value; and payload data.

Example 15 includes the subject matter of any of Examples 8-14, and further includes an image sensor operatively coupled to the processor.

Example 16 includes the subject matter of Example 15, where the image sensor is configured to detect a depth to a point within a scene.

Example 17 is a non-transient computer program product encoded with instructions that when executed by one or more processors cause a process to be carried out, the process comprising: generating three-dimensional (3D) depth information based on image data representing a digital image, the 3D depth information representing a distance between a viewpoint and an object in the digital image; generating a data structure having the 3D depth information encoded therein; and storing the data structure in the digital image file.

Example 18 includes the subject matter of Example 17, where the process further comprises encoding the data structure in a Joint Photographic Experts Group (JPEG)-compliant application-specific segment.

Example 19 includes the subject matter of any of Examples 17-18, where the application-specific segment is an APP3 segment.

Example 20 includes the subject matter of any of Examples 17-19, and further includes encoding in the data structure: a version number; reference image data; calibration data; and disparity data.

Example 21 includes the subject matter of Example 20, where the disparity data includes an 8-bit Portable Network Graphics (PNG) file.

Example 22 includes the subject matter of Example 21, where the PNG file includes a plurality of grayscale pixels each having a brightness representing a disparity value.

Example 23 includes the subject matter of any of Examples 20-22, and further includes encoding in the data structure: an application marker; an application segment length value; a tag name value; a chunk number value; a total number of chunks value; and payload data.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method of storing depth information in a digital image file, the method comprising:
generating three-dimensional (3D) depth information based on image data representing a digital image, the 3D depth information representing a distance between a viewpoint and an object in the digital image;

generating a data structure having the 3D depth information encoded therein;
encoding the data structure in a Joint Photographic Experts Group (JPEG)-compliant application-specific segment;
encoding calibration data in the application-specific segment; and
storing the data structure in the digital image file.

2. The method of claim 1, wherein the application-specific segment is an APP3 segment.

3. The method of claim 1, further comprising encoding in the application-specific segment:
a version number;
reference image data;
the calibration data; and
disparity data.

4. The method of claim 3, wherein the disparity data includes an 8-bit Portable Network Graphics (PNG) file.

5. The method of claim 4, wherein the PNG file includes a plurality of grayscale pixels each having a brightness representing a disparity value.

6. The method of claim 1, further comprising encoding in the data structure:
an application marker;
an application segment length value;
a tag name value;
a chunk number value;
a total number of chunks value; and
payload data.

7. The method of claim 1, further comprising encoding disparity data in a JPEG-compliant application-specific segment that is separate from the JPEG-compliant application-specific segment in which the calibration data is encoded.

8. An image processing system comprising:
a storage; and
a processor operatively coupled to the storage, the processor configured to execute instructions stored in the storage that when executed cause the processor to carry out a process comprising:
generating three-dimensional (3D) depth information based on image data representing a digital image, the 3D depth information representing a distance between a viewpoint and an object in the digital image;
generating a data structure having the 3D depth information encoded therein;
encoding the data structure in a Joint Photographic Experts Group (JPEG)-compliant application-specific segment;
encoding calibration data in the application-specific segment; and
storing the data structure in the digital image file.

9. The system of claim 8, wherein the application-specific segment is an APP3 segment.

10. The system of claim 8, wherein the process further comprises encoding in the application-specific segment:
a version number;
reference image data;
the calibration data; and
disparity data.

11. The system of claim 10, wherein the disparity data includes an 8-bit Portable Network Graphics (PNG) file.

12. The system of claim 11, wherein the PNG file includes a plurality of grayscale pixels each having a brightness representing a disparity value.

13. The system of claim 8, wherein the process further comprises encoding in the data structure:
an application marker;
an application segment length value;
a tag name value;
a chunk number value;
a total number of chunks value; and
payload data.

14. The system of claim 8, further comprising an image sensor operatively coupled to the processor.

15. The system of claim 14, wherein the image sensor is configured to detect a depth to a point within a scene.

16. The system of claim 8, wherein the process further comprises encoding the disparity data in a JPEG-compliant application-specific segment that is separate from the JPEG-compliant application-specific segment in which the calibration data is encoded.

17. A non-transient computer program product encoded with instructions that when executed by one or more processors cause a process to be carried out, the process comprising:
generating three-dimensional (3D) depth information based on image data representing a digital image, the 3D depth information representing a distance between a viewpoint and an object in the digital image;
generating a data structure having the 3D depth information encoded therein;
encoding the data structure in a Joint Photographic Experts Group (JPEG)-compliant application-specific segment;
encoding calibration data in the application-specific segment; and
storing the data structure in the digital image file.

18. The computer program product of claim 17, wherein the process further comprises encoding in the application-specific segment:
a version number;
reference image data;
the calibration data; and
disparity data.

19. The computer program product of claim 17, wherein the process further comprises encoding in the data structure:
an application marker;
an application segment length value;
a tag name value;
a chunk number value;
a total number of chunks value; and
payload data.

20. The computer program product of claim 17, wherein the process further comprises encoding disparity data in a JPEG-compliant application-specific segment that is separate from the JPEG-compliant application-specific segment in which the calibration data is encoded.

* * * * *